March 3, 1970  C. A. CRAWFORD  3,498,630
AUTOMATIC WHEEL ALIGNMENT MECHANISM FOR AUTOMOTIVE VEHICLES
Filed May 6, 1968
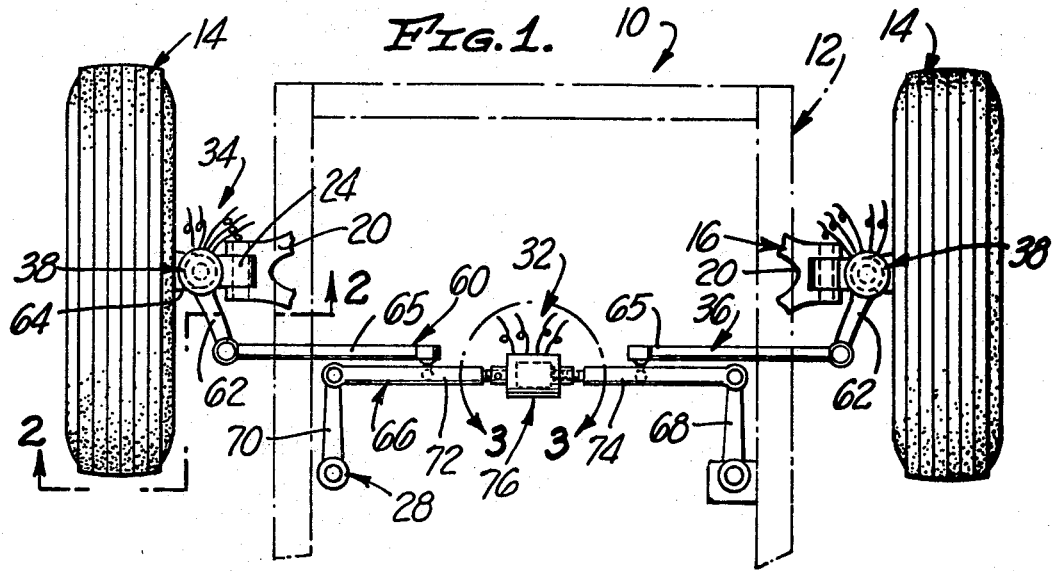
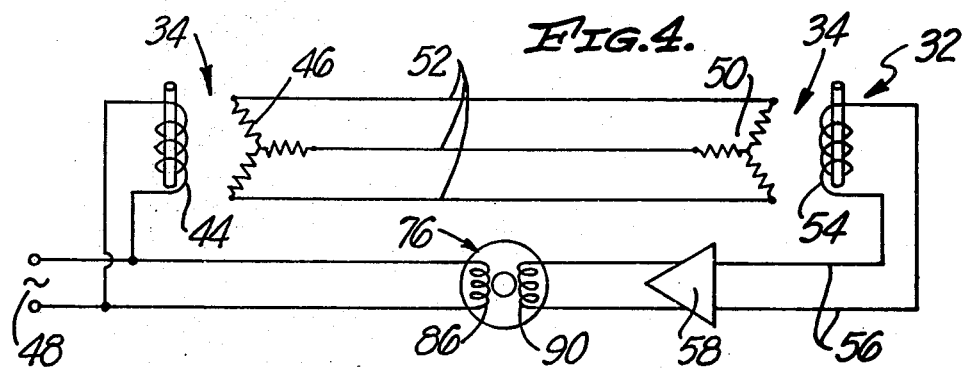
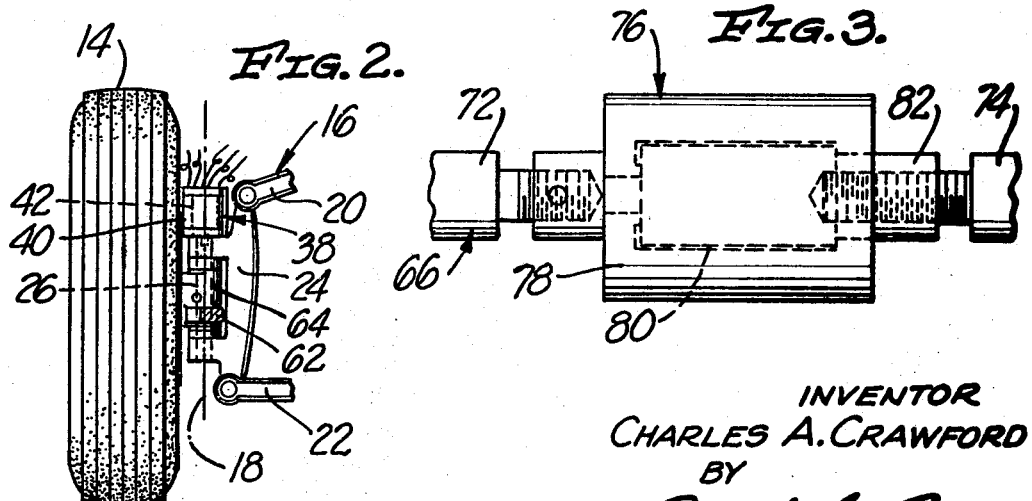
INVENTOR
CHARLES A. CRAWFORD
BY
ATTORNEY United States Patent Office 3,498,630
Patented Mar. 3, 1970

3,498,630
AUTOMATIC WHEEL ALIGNMENT MECHANISM FOR AUTOMOTIVE VEHICLES
Charles A. Crawford, 2226 Batson Ave., Rowland Heights, Calif. 91745
Filed May 6, 1968, Ser. No. 726,808
Int. Cl. B62d 17/00; B60g 3/26; B60d 7/06
U.S. Cl. 280—87            7 Claims

ABSTRACT OF THE DISCLOSURE

An automatic alignment mechanism for the front wheels of an automotive vehicle is provided. The alignment for generating error signals in response to and related to the direction of misalignment of the wheels, and a wheel alignment correction means controlled by the error signals for realigning the wheels in response to the signals

BACKGROUND OF THE INVENTION

Field of the invention

This invention relates generally to automotive vehicles and more particularly to an automatic alignment mechanism for the front wheels of such vehicles.

Prior art

It is well known that the front wheels of an automotive vehicle must be properly aligned to insure safe operation of the vehicle, provide proper steering control, and prevent excessive tire wear. At the present time, wheel alignment is a task which must be performed manually at periodic intervals. Moreover, in the event that the front wheels receive an abnormal impactor shock, it may be necessary to realign the wheels well before the regular servicing time. The task of aligning vehicle wheels is relatively costly, time consuming, requires delivery of the vehicle to the proper servicing facility, and necessitates either loss of the use of the vehicle for an undesirable period of time and/or requires waiting of the owner at the servicing facility while the task is performed.

SUMMARY OF THE INVENTION

The present invention provides an automatic wheel alignment mechanism which is installed directly on an automatic vehicle and which operates to automatically and continuously maintain the wheels aligned. In general terms, the wheel alignment mechanism is characterized by sensors which are operatively connected to the front wheels and are electrically interconnected to one another to compare the angular positions of the wheels about their king pin or steering axes. These sensors generate error signals in response to any misalignment of the wheels. Such error signals are related to the direction of the wheel misalignment. Associated with the sensors is a wheel alignment correction means. This correction means is operatively connected to the sensors in such a way as to respond to the error signals by rotating the wheels relative to one another about their respective steering axes in the proper direction and through the proper angle to restore the wheels to alignment.

In the particular embodiment of the invention which has been selected for illustration in this disclosure, the wheel sensors comprise electrical synchros or the like. The alignment correction means comprises a telescoping link and lead screw connection between the steering arms of the wheels. The lead screw connection is powered by a motor which is controlled by the arrow signals from the synchro generators in such a way that one error signal energizes the motor in a direction to extend the connecting link and thereby rotate the wheels in one direction relative to one another about their respective steering axes. The other error signal energizes the motor in the opposite direction to effectively contract the connecting link and thereby cause relative rotation of the wheels in the opposite directions about their respective steering axes.

BRIEF DESCRIPTION OF THE DRAWINGS

FIGURE 1 is a fragmentary top plan view of the front end of an automotive vehicle equipped with the present wheel alignment mechanism;

FIGURE 2 is an enlarged view looking in the direction of the arrows on line 2—2 in FIGURE 1;

FIGURE 3 is an enlargement of the area enclosed by the circular arrow 3—3 in FIGURE 1; and FIGURE 4 is a schematic electrical circuit diagram of the wheel alignment mechanism.

DESCRIPTION OF THE PREFERRED EMBODIMENT

Turning now to these drawings, there is illustrated, in fragmentary fashion, an automotive vehicle 10 including a frame 12, front wheels 14, and suspension means 16 supporting the wheels 14 on the frame 12 for steering movement of the wheels about steering axes 18. As will appear from the ensuing description, the present wheel alignment mechanism may be employed on vehicles having various types of front wheel suspension systems. The particular vehicle illustrated has an independent front wheel suspension system including a pair of upper and lower control arms 20 and 22 for each wheel. The inner ends of these arms are pivotally supported on the frame 12. The outer ends of the arms are pivotally attached to a wheel mounting member 24. The corresponding front wheel 14 is pivotally attached to this mounting member, by a king pin 26, for turning of the wheel on its steering axis 18. Each front wheel, of course, is also rotatable on its central axis. The automotive vehicle 10 is also equipped with a steering gear 28 including a steering wheel (not shown) by which the front wheels 14 may be rotated in unison on their respective steering axes to steer the vehicle.

According to the present invention the vehicle 10 is equipped with an automatic wheel alignment mechanism 32 for automatically and continuously maintaining the front vehicle wheels 14 in alignment. As noted earlier, such alignment of the front wheels is necessary to safe operation of the vehicle, proper steering control of the vehicle, and normal tire wear. In general terms, the wheel alignment mechanism 32 comprises sensing means 34 and wheel alignment correction means 36. The sensing means 34 are operatively connected to the front vehicle wheels 14 for sensing and comparing the relative angular positions of the wheels about their respective steering axes 18 and generating electrical error signals in response to and related to the direction of misalignment of the wheels about these axes. The wheel alignment correction means 36 are operatively connected to the sensing means 34 to rotate the wheels 14 relative to one another about their steering axes 18 in response to error signals from the sensing means and in the proper direction and through the proper angle to restore the wheels to aligned positions.

Referring now in greater detail to the embodiment of the invention which has been selected for illustration in the drawings, the wheel angle sensing means 34 comprise a pair of electrical sensors 38 which are operatively connected to the wheels 14, respectively, in such a way as to respond to rotation of the wheels about their respective steering axes 18. In this case, the wheel angle sensors 38 comprise electrical synchros each including a stator 40 and a rotor 42. Each synchro stator 40 is rigidly secured to one supporting member for its respective wheel, and each synchro rotor is rigidly secured to another supporting member for its respective wheel in such a way that each rotor and stator undergo relative rotation in response to and through an angle proportional to the angle of rotation of the respective wheel about its steering axis 18. In this instance, the synchro stator 40 for each wheel 14 is secured to the corresponding wheel supporting member 24 which is restrained against rotation about the wheel steering axis 18. The synchro rotor 42 for each wheel is secured to the kingpin 26 for the respective wheel which rotates with the wheel about its steering axis 18. It will be understood, therefore, that the synchro stators 40 and rotors 42 undergo relative rotation in response to turning of the wheels 14 on their respective steering axes 18 and through an angle related to the angle of rotation of the wheels.

One of the synchros 34 constitutes a transmitter and the other synchro constitutes a receiver. In FIGURE 4, the left-hand synchro is the transmitter and the right-hand synchro is the receiver. The transmitting synchro has a rotor winding 44 and a stator winding 46. The rotor winding 44 is energized from an AC power source 48 on the automotive vehicle 10. The receiving synchro has a stator winding 50 which is electrically connected, through leads 52, to the stator winding 46 of the transmitting synchro. The receiving synchro also has a rotor winding 54. This rotor winding is electrically connected through leads 56 to an amplifier 58.

Assume now that the rotor winding 44 of the transmitting synchro 34 is energized from the AC power supply 48. Assume further that the rotors 42 of the two synchros are aligned, that is, they occupy corresponding angular positions. Under these conditions, no electrical voltage is generated within the rotor winding 54 of the receiving synchro. Assume next that the synchro rotors are slightly misaligned, that is, the rotors are rotated slightly from their corresponding angular positions. This misalignment of the rotors causes a small voltage to be induced in the rotor winding 54 of the receiving synchro. The magnitude of this voltage is related to the angle of relative rotation of the rotors. The polarity of the voltage is related to the direction of such relative rotation. The voltages thus induced in the rotor winding 54 of the reciving synchro 34 are fed to the amplifier 58 to produce amplified electrical signals which constitute the error signals referred to earlier.

As noted, these error signals control a wheel alignment correction means 36. The illustrated wheel alignment correction means comprises a connecting linkage 60 which forms part of the front wheel steering gear 28 and operatively connects the outer ends of the front wheel steering arms 62. The inner ends of these arms are rigidly joined to front wheel mounting brackets 64 which rotatably support the vehicle wheels 14 for turning on their respective central axes and are rigidly attached to the kingpins 26 for turning of the wheels on their respective steering axes 18. Linkage 60 comprises a pair of tie rods 65 which are pivotally connected between the outer ends of the front wheel steering arms 62 and a relay arm 66. This relay arm, in turn, is pivotally attached at one end to an idler arm 68 pivotally supported on the vehicle frame 12 and at the opposite end to a steering gear arm 70. Steering gear arm 70 is operatively connected to the steering wheel (not shown) through a steering gear box (not shown).

As noted earlier, the linkage 60 constitutes part of the front wheel steering gear 28. This linkage, as it is thus far described, is generally conventional and is effective to transmit steering torque from the vehicle steering wheel to the vehicle front wheels 14 in such a way as to drive the latter wheels in steering movement or rotation about their respective steering axes 18.

According to the present invention, the relay arm 66 is composed of two relatively longitudinally movable sections 72 and 74. The wheel alignment correction means 36 comprises an electric motor 76 for driving the relay arm sections in either longitudinal direction relative to one another. To this end, the stator 78 of the motor is rigidly secured to one of the relay arm sections, in this instance the relay arm section 72. Coaxially secured to the rotor 80 of the motor is a lead screw nut 82 which is threaded on the adjacent end of the other relay arm section 74.

It will now be understood, therefore, that energizing of the motor 76 in one direction is effective to drive the relay arm sections 72, 74 longitudinally away from one another and thereby effect relative rotation of the front vehicle wheels 14 in one direction about their respective steering axes 18. Energizing of the motor in the opposite direction is effective to drive the relay arm sections 72, 74 longitudinally toward one another and thereby cause relative rotation of the vehicle wheels in the opposite direction about their respective steering axes.

Returning to FIGURE 4, it will be observed that the motor 76 is a conventional servo motor including a stator winding 86 and a rotor winding 90. The stator winding 86 is electrically connected to the AC power source 48 on the vehicle 10. The motor winding 90 is electrically connected to the output of the error signal amplifier 58.

The present wheel alignment mechanism is installed on the automotive vehicle 10 in such a way that when the vehicle wheels 14 are properly aligned, the stators 40 and rotors 42 of the wheel sensors or stators 34 will occupy corresponding angular positions, whereby no error signals will be generated within the rotor winding 54 of the receiving synchro. Under these conditions, the servo motor 76 remains effectively deenergized so that its stator 78 and rotor 80 are not driven in relative rotation. The linkage 60 then serves to interconnect the front wheels 14 for unified steering movement of these wheels on the respective steering axes 18 by rotation of the vehicle steering wheels. In the event that the wheels 14 become misaligned, the synchro rotors and stators are rotated from their corresponding angular positions. Under these conditions, an error signal is generated within the rotor winding 54 of the receiving synchro. This error signal is amplified at 58 and fed to the servo motor winding 90 to energize the latter in the proper direction to longitudinally extend or contract the relay arm 66, i.e., drive the relay arm sections 72, 74 longitudinally away from or toward one another, as required to return the wheels 14 to their normal condition of alignment.

What is claimed as new in support of Letters Patent is:

1. An automatic wheel alignment mechanism for a vehicle having a frame, a pair of wheels, suspension means mounting said wheels on said frame for pivotal steering movement of said wheels relative to said frame about steering axes, and a steering gear for steering said wheels, said mechanism comprising:
    sensing means operatively connected to said wheels for sensing the relative angular positions of said wheels about their respective steering axes and generating electrical error signals in response to and related to the direction of misalignment of said wheels about said axes, and
    power operated wheel alignment correction means electrically connected to and controlled by said sensing means and operatively connected to said wheels for driving said wheels in relative rotation about their respective steering axes in response to said error signals to realign said wheels.

2. A wheel alignment mechanism according to claim 1 wherein:
    said wheel suspension means comprise first wheel mounting members secured to said frame so as to be restrained against rotation about said steering axes and second wheel mounting members secured to said wheels, respectively, for rotation with said wheels about said steering axes relative to said first members, and
    said sensing means comprise electrical sensors cooperatively associated with said wheels, respectively, each including a rotor and a stator operatively connected to the corresponding wheel mounting members, whereby said rotor and stator undergo relative rotation about the corresponding steering axes during steering movement of the respective wheel, and the rotors of said sensors ocupy corresponding angular positions relative to their respective stators when said wheels are aligned, and electrical means interconnecting said rotors and stators for generating said error signals in response to relative rotation of said rotors and stators from said corresponding angular positions.

3. A wheel alignment mechanism according to claim 2 wherein:
said sensors comprise electrical synchros.

4. A wheel alignment mechanism according to claim 1 wherein:
said wheel mounting means comprise stationary wheel supporting members secured to said frame so as to be restrained against rotation on said steering axes and rotary wheel supporting members secured to said wheels, respectively, for rotation with said wheels about their respective steering axes,
said steering gear comprises steering arms secured to said rotary wheels supports, respectively, and a relay arm having two separate longitudinally aligned sections pivotally connected to said steering arms, respectively, and
said alignment correction means comprises a motor controlled by said error signals for rotation in one direction in response to one error signal and rotation in the opposite direction in response to the other error signal, and coupling means operatively connecting said motor to said relay arm sections, whereby rotation of said motor in one direction drives said relay arm sections longitudinally toward one another and rotation of said motor in the opposite direction drives said relay arm sections longitudinally toward one another.

5. A wheel alignment mechanism according to claim 4 wherein:
said motor includes a rotor member and a stator member, means rigidly securing one of said motor members to one relay section, and a lead screw not secured to the other motor member and threaded on the other relay arm section.

6. A wheel alignment mechanism according to claim 5 wherein:
said sensing means comprise electrical sensors cooperatively associated with said wheels, respectively, each including a stator secured to the corresponding stationary wheel mounting member and a rotor secured to the corresponding rotary wheel mounting member, whereby said sensor rotor and stator undergo relative rotation about the steering axis of the corresponding wheel during steering movement of the wheel, and the sensor rotors and stators occupy corresponding relative angular positions when said wheels are aligned, and electrical means interconnecting said sensor rotors and stators for generating said error signals in response to relative rotation of said sensor rotors and stators from their corresponding angular positions.

7. A wheel alignment mechanism according to claim 6 wherein:
said sensors comprise electrical synchros, and said motor comprises a servomotor.

References Cited

UNITED STATES PATENTS

| | | | |
|---|---|---|---|
| 2,878,030 | 3/1959 | Couch | 280—95 |
| 3,229,992 | 1/1966 | Traywick | 280—95 |
| 3,438,646 | 4/1969 | Hannapel | 280—96.2 X |

KENNETH H. BETTS, Primary Examiner

U.S. Cl. X.R.

280—95, 96.2; 100—79.1